(12) United States Patent
Tanimura et al.

(10) Patent No.: US 12,055,252 B2
(45) Date of Patent: Aug. 6, 2024

(54) HYDRAULIC ADAPTER UNIT, HYDRAULIC PIPE MEMBER, AND METHOD FOR MANUFACTURING HYDRAULIC PIPE MEMBER

(71) Applicant: TOYO ASSEMBLY CO., LTD., Aichi (JP)

(72) Inventors: Tomohiko Tanimura, Aichi (JP); Norihiko Sugiura, Aichi (JP)

(73) Assignee: TOYO ASSEMBLY CO., LTD., Aichi (JP)

( * ) Notice: Subject to any disclaimer, the term of this patent is extended or adjusted under 35 U.S.C. 154(b) by 234 days.

(21) Appl. No.: 17/611,762

(22) PCT Filed: May 22, 2020

(86) PCT No.: PCT/JP2020/020213
§ 371 (c)(1),
(2) Date: Nov. 16, 2021

(87) PCT Pub. No.: WO2020/235666
PCT Pub. Date: Nov. 26, 2020

(65) Prior Publication Data
US 2022/0228680 A1 Jul. 21, 2022

(30) Foreign Application Priority Data

May 23, 2019 (JP) ................................. 2019-096700

(51) Int. Cl.
*F16L 41/08* (2006.01)
*F16L 33/207* (2006.01)
(Continued)

(52) U.S. Cl.
CPC ........... *F16L 41/086* (2013.01); *F16L 33/207* (2013.01); *F16L 41/08* (2013.01); *F16L 15/08* (2013.01); *F16L 23/02* (2013.01)

(58) Field of Classification Search
CPC ...... F16L 33/223; F16L 33/207; F16L 41/086
(Continued)

(56) References Cited

U.S. PATENT DOCUMENTS 3,055,682 A * 9/1962 Bacher .................... F16L 33/18
285/248
3,129,022 A * 4/1964 Avery ..................... F16L 33/18
285/249
(Continued)

FOREIGN PATENT DOCUMENTS

CN 108612947 A * 10/2018
CN 115183076 A * 10/2022
(Continued)

OTHER PUBLICATIONS

"The Products of Yokohama—hose fittings for field crimps", The Yokohama Rubber Co., Ltd., Jan. 2022, pp. 4-5, cover, colophon.
(Continued)

*Primary Examiner* — Zachary T Dragicevich
(74) *Attorney, Agent, or Firm* — Greenblum & Bernstein, P.L.C.

(57) ABSTRACT

A hydraulic adapter unit includes a hose connecting member and a pipe member. The hose connecting member is a substantially cylindrical hose connecting member, and includes: a hose fixing portion positioned at one end side of the hose connecting member and to which the hose is fixed; a first combining portion positioned at the other end side of the hose connecting member; and an intermediate portion linking the hose fixing portion and the first combining portion. The pipe member includes: a substantially tubular pipe body; a second combining portion disposed at the one end side of the pipe body and separably combined to the first combining portion of the hose connecting member; and a flange portion disposed at the other end side of the pipe body (Continued)

and formed so as to project outward in the radial direction of the pipe body and fixed to a hydraulic device.

9 Claims, 7 Drawing Sheets

(51) Int. Cl.
*F16L 15/08* (2006.01)
*F16L 23/02* (2006.01)

(58) Field of Classification Search
USPC .................................................. 285/245–251
See application file for complete search history.

(56) References Cited

U.S. PATENT DOCUMENTS

| | | | | |
|---|---|---|---|---|
| 4,252,346 | A | * | 2/1981 | Sundholm ............. F16L 41/086 |
| 4,736,969 | A | * | 4/1988 | Fouts ..................... F16L 33/223 |
| | | | | 285/250 |
| 5,817,980 | A | * | 10/1998 | Kirma ...................... H02G 3/06 |
| | | | | 285/249 |
| 6,419,278 | B1 | | 7/2002 | Cunningham |
| 2014/0312610 | A1 | * | 10/2014 | Chiang ................. F16L 33/223 |
| 2015/0097366 | A1 | | 4/2015 | Glidewell et al. |
| 2016/0116093 | A1 | * | 4/2016 | Filipczak .............. F16L 33/223 |
| 2019/0301653 | A1 | * | 10/2019 | Dickison ............... F16L 41/086 |

FOREIGN PATENT DOCUMENTS

| | | |
|---|---|---|
| EP | 1 162 399 A2 | 12/2001 |
| JP | H06-229489 A | 8/1994 |
| JP | H08-261378 A | 10/1996 |
| JP | 2004-36861 A | 2/2004 |

OTHER PUBLICATIONS

"Adapter Handbook—lineup of pipe joints and peripheral products of Yokohama Rubber MB Japan, Inc.," Yokohama Industrial Products Japan Co., Ltd., Apr. 2016, p. 130, cover.

Hayashi, Hirotsugu et al. "Mechanical Drawing," Jikkyo Shuppan Co., Ltd., Jan. 25, 2015, p. 242.

Notice of Reasons for Revocation Japanese Patent No. 6993042, issued Oct. 11, 2022, English translation.

International Search Report issued in International Patent Application No. PCT/JP2020/020213, dated Aug. 18, 2020, along with an English translation thereof.

International Preliminary Report on Patentability issued in International Patent Application No. PCT/JP2020/020213, dated Nov. 16, 2021, along with an English translation thereof.

\* cited by examiner

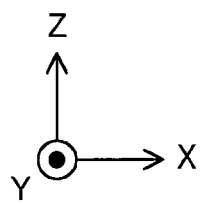
FIG.5
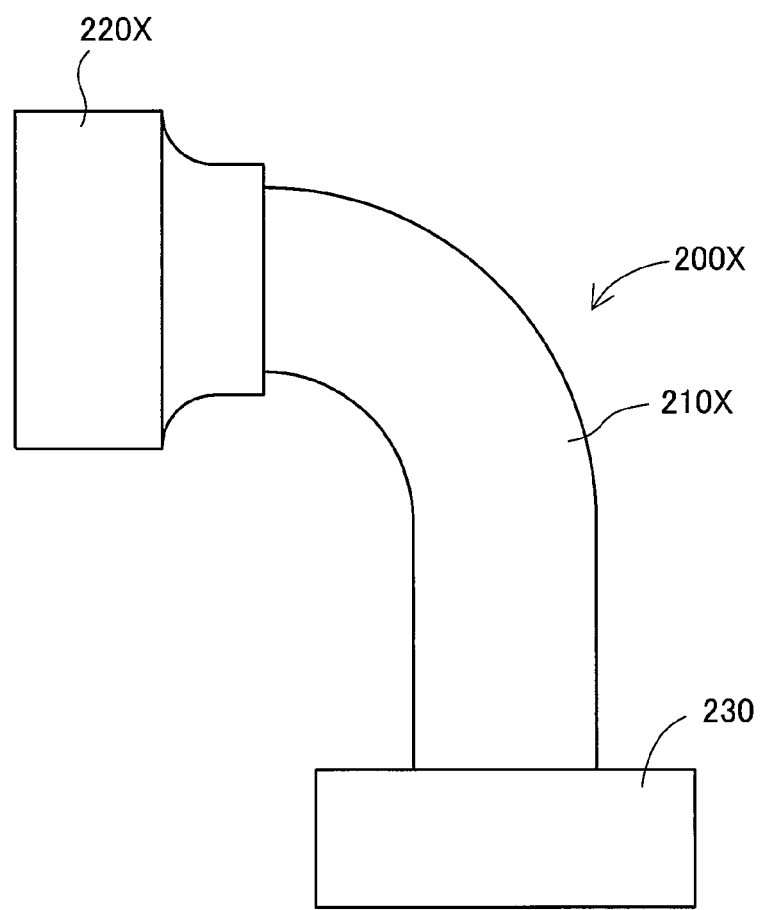

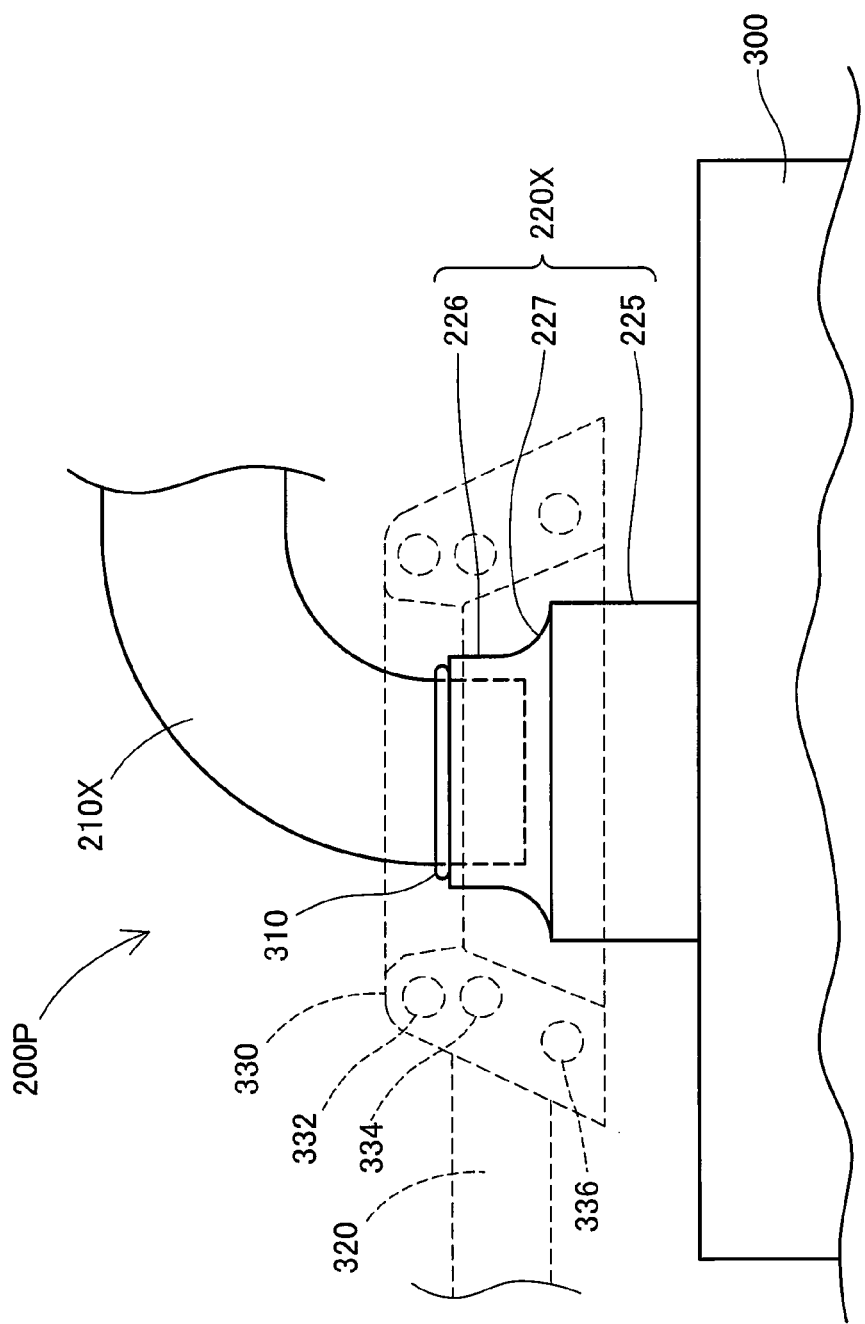

HYDRAULIC ADAPTER UNIT, HYDRAULIC PIPE MEMBER, AND METHOD FOR MANUFACTURING HYDRAULIC PIPE MEMBER

TECHNICAL FIELD

The techniques disclosed herein relate to a hydraulic adapter unit.

BACKGROUND ART

A hydraulic adapter member for coupling a hose with a hydraulic device has been known. The hydraulic adapter member includes: a tubular pipe body; a mouthpiece portion formed on one end side of the pipe body and to which a hose is caulked and fixed; and a flange portion formed on the other end side of the pipe body to project outward in the radial direction of the pipe body and fixed to the hydraulic device (see, for example, Patent Document 1).

CITATION LIST

Patent Literature

Patent Document1: Japanese Unexamined Patent Application Publication No. H06-229489

SUMMARY OF INVENTION

Technical Problem

In the conventional hydraulic adapter member described above, the pipe body and the mouthpiece portion are integrally formed and inseparable. Therefore, for example, it is difficult or impossible to couple the flange portion of the hydraulic adapter member to the hydraulic device or to replace the hose.

This specification discloses techniques capable of solving at least some of the problems described above.

Solution to Problem

The techniques disclosed herein can be implemented in the following forms.

(1) A hydraulic adapter unit disclosed herein is a hydraulic adapter unit for coupling a hose with a hydraulic device, comprising: substantially cylindrical hose connecting member including: a hose fixing portion positioned at one end side of the hose connecting member and to which the hose is fixed; a first combining portion positioned at the other end side of the hose connecting member; and an intermediate portion linking the hose fixing portion and the first combining portion; and a pipe member including: a substantially tubular pipe body; a second combining portion disposed at the one end side of the pipe body and separably combined to the first combining portion of the hose connecting member; and a flange portion disposed at the other end side of the pipe body and formed so as to project outward in the radial direction of the pipe body and fixed to the hydraulic device.

In the hydraulic adapter unit, the hose connecting member to which a hose is fixed and the pipe member having the flange portion fixed to the hydraulic device are separably combined to each other. Thus, by separating the hose connecting member and the pipe member, the fixing work of the pipe member to the hydraulic device or the fixing work of the hose to the hose connecting member can be carried out independently. In other words, the present hydraulic adapter unit improves workability in coupling of the hose with the hydraulic device.

(2) In the hydraulic adapter unit, the first combining portion of the hose connecting member may have a male screw portion formed on an outer peripheral surface of the hose connecting member; and the second combining portion of the pipe member may have a female screw portion formed on an inner peripheral surface of the pipe member and screwed to the male screw portion of the first combining portion.

In the present hydraulic adapter unit, since the second combining portion of the pipe member has the female screw portion, it is possible to suppress the leakage of the hydraulic oil supplied from the hose to the hydraulic device from the portion between the hose connecting member and the pipe member as compared with a configuration in which the second combining portion has a male screw portion.

(3) In the hydraulic adapter unit, the second combining portion of the pipe member may be substantially annular and may include: one end portion positioned at the one end side of the second combining portion and having the female screw portion formed on the inner peripheral side; and the other end portion which is positioned at the other end side of the second combining portion and to which the pipe body is inserted and joined on the inner peripheral side, wherein the thickness of the one end portion may be greater than the thickness of the other end portion and greater than the thickness of the pipe body, and the thickness of the other end portion may be closer to the thickness of the pipe body than the thickness of the one end portion. In the hydraulic adapter unit, the thickness of one end portion of the second combining portion of the pipe member is thicker than the thickness of the other end portion or the pipe body. Therefore, for example, it is possible to improve the strength of the one end portion where the female screw portion is formed as compared with a configuration in which the thickness of the one end portion is as thin as the thickness of the other end portion. On the other hand, the thickness of the other end portion is closer to the thickness of the pipe body than the thickness of the one end portion. Therefore, the second combining portion (pipe member) can be reduced in size and weight as compared with a configuration in which the thickness of the other end portion is as large as the thickness of the one end portion. Further, for example, as compared with a configuration in which the thickness of the other end portion is closer to the thickness of the one end portion than the thickness of the pipe body, it is possible to suppress stress concentration which would otherwise be caused by the difference in thickness between the other end portion and the pipe body.

(4) In the hydraulic adapter unit, the outer diameter of the other end portion may be smaller than the outer diameter of the one end portion, and the outer peripheral surface of the other end portion may be substantially parallel to the axial direction of the second combining portion. In the hydraulic adapter unit, the other end of the second combining portion of the pipe member to which the pipe body is connected has an outer diameter smaller than that of the one end. The outer peripheral surface of the other end portion is substantially parallel to the axial direction of the second combining portion. Therefore, as compared with, for example, a configuration in which the outer diameter of the other end portion is relatively large, or a configuration in which the outer peripheral surface of the other end portion is inclined with respect to the axial direction, it is possible to relax stress concentration at the portion at which the pipe body is joined with the second combining portion while limiting the size of the second combining portion.

(5) In the hydraulic adapter unit, the second combining portion of the pipe member may have a tapered portion linking the one end portion and the other end portion and having an outer diameter continuously decreasing from the one end portion toward the other end portion. In the hydraulic adapter unit, the second combining portion of the pipe member has a tapered portion linking the one end portion and the other end portion, and the tapered portion has an outer diameter continuously decreasing from the one end portion to the other end portion. Therefore, as compared with a configuration in which a step is formed between one end portion and the other end portion, it is possible to relax stress concentration between the one end portion and the other end portion and avoid a thin-walled portion to be formed at the second combining portion due to the existence of the step.

(6) In the hydraulic adapter unit, the intermediate portion of the pipe body in the pipe member may have a bent portion having a bent shape. In this hydraulic adapter unit, a pipe body in a pipe member has a bent portion. In such a configuration in which the pipe body of the pipe member has a bent portion, for example, the bent portion interfere the fixing work of the hose to the hose connecting member, thereby making the fixing work to be impossible or difficult. With regard to this, in the present hydraulic adapter unit, by separating the hose connecting member and the pipe member, the hose can be fixed to the hose connecting member without being interfered by the bent portion of the pipe member.

(7) A hydraulic pipe member disclosed herein is a hydraulic pipe member for coupling a hydraulic device with a hose connecting member having one end side to which a hose is fixed and the other end side on which a first combining portion is formed, comprising: a tubular pipe body; a second combining portion disposed on the one end side of the pipe body and separably combined to the first combining portion of the hose connecting member; and a flange portion disposed on the other end side of the pipe body and formed to project outward in the radial direction of the pipe body and fixed to the hydraulic device. The present hydraulic pipe member can improve the workability of the coupling of the hose with the hydraulic device.

(8) In the above hydraulic pipe member, the second combining portion of the hydraulic pipe member may be substantially annular and may include: one end portion positioned at the one end side of the second combining portion and having a female screw portion formed on the inner peripheral side, which can be screwed to a male screw portion of the first combining portion; and the other end portion positioned at the other end side of the second combining portion and to which the pipe body is inserted and joined on the inner peripheral side; and the thickness of the one end portion may be greater than the thickness of the other end portion and greater than the thickness of the pipe body, and the thickness of the other end portion may be closer to the thickness of the pipe body than the thickness of the one end portion.

(9) In the above hydraulic pipe member, the outer diameter of the other end portion may be smaller than the outer diameter of the one end portion, and the outer peripheral surface of the other end portion may be substantially parallel to the axial direction of the second combining portion.

(10) In the above hydraulic pipe member, the second combining portion may have a tapered portion linking the one end portion and the other end portion and having an outer diameter continuously decreasing from the one end portion toward the other end portion.

(11) A method for manufacturing a hydraulic pipe member disclosed herein is a method for manufacturing a hydraulic pipe member including a tubular pipe body and a second combining portion disposed on one end side of the pipe body and separably combined to a first combining portion of a hose connecting member to which a hose is fixed, comprising: a preparation step of preparing the pipe body and the second combining portion, wherein the second combining portion is substantially annular, and includes: one end portion positioned at the one end side of the second combining portion and having a female screw portion formed on the inner peripheral side, which can be screwed to a male screw portion of the first combining portion, and the other end portion positioned at the other end side of the second combining portion and having a thickness thinner than the thickness of the one end portion; a joining step of inserting the pipe body into the inner peripheral side of the other end portion of the second combining portion, and disposing a brazing material in the vicinity of the inner peripheral side of the other end portion, and performing a high-frequency induction heating treatment by flowing an alternating current to a first coil surrounding the pipe body, a second coil surrounding the other end portion, and a third coil surrounding the one end portion. According to the present method for manufacturing a hydraulic pipe member, it is possible to prevent the occurrence of a joint failure between the pipe body and the other end portion which would be caused in a case where the heat generated at the other end portion escapes to the one end portion.

The techniques disclosed herein can be implemented in a variety of forms, such as, for example, a hydraulic adapter unit, a hydraulic pipe member, a hydraulic hose connecting member, and a manufacturing methods of them, and a method of coupling a hose with a hydraulic device.

BRIEF DESCRIPTION OF DRAWINGS

FIG. 5 is an explanatory view illustrating an XZ plane configuration of the pipe member 200X according to the second embodiment.

FIG. 7 is an explanatory view illustrating a part of a manufacturing process of the pipe member 200X.

DESCRIPTION OF EMBODIMENTS

A. First Embodiment

Figure 1:
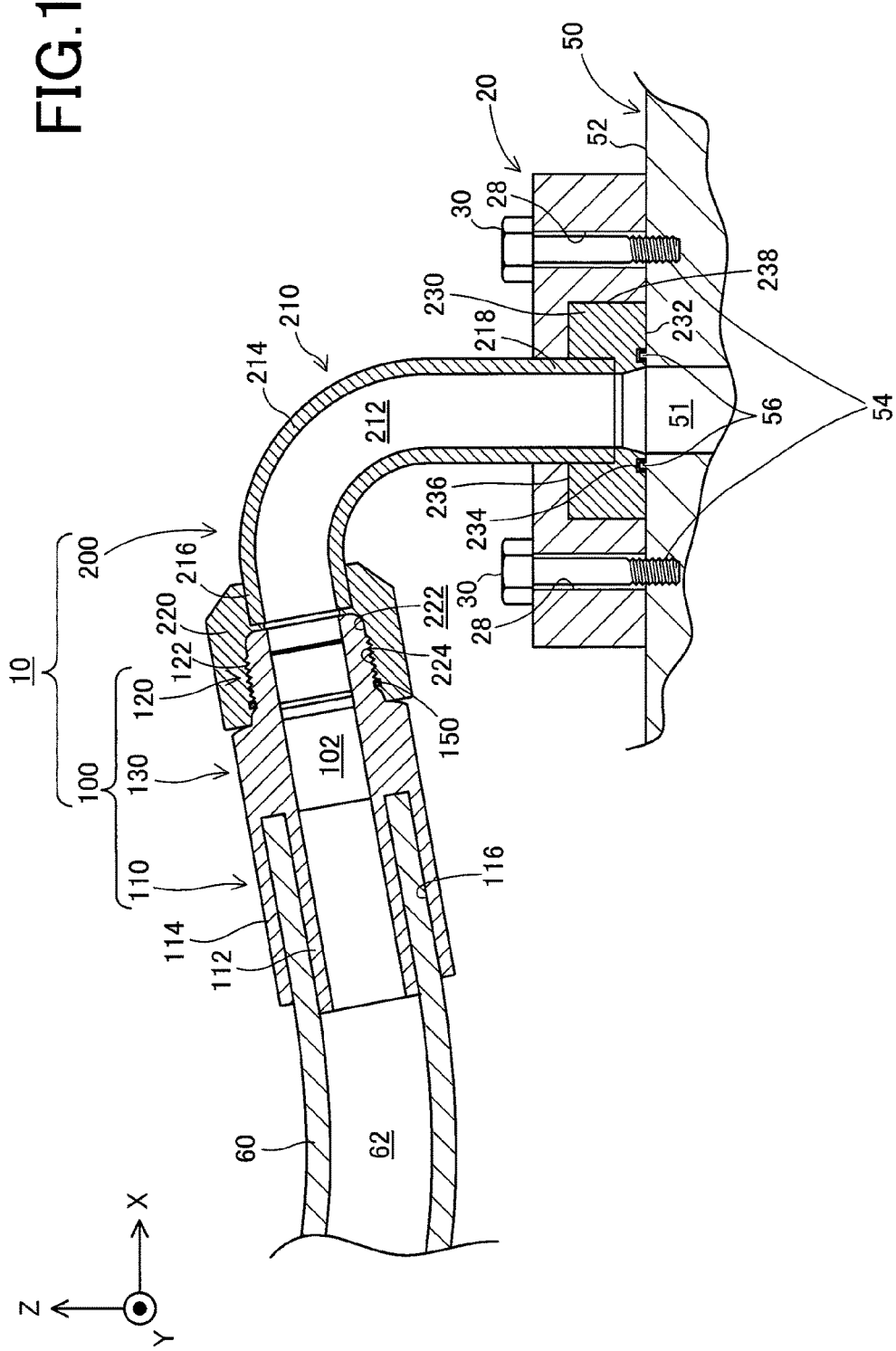
FIG. 1 is an explanatory view illustrating an XZ cross-sectional configuration of a hydraulic adapter unit 10 according to a first embodiment.
Figure 2:
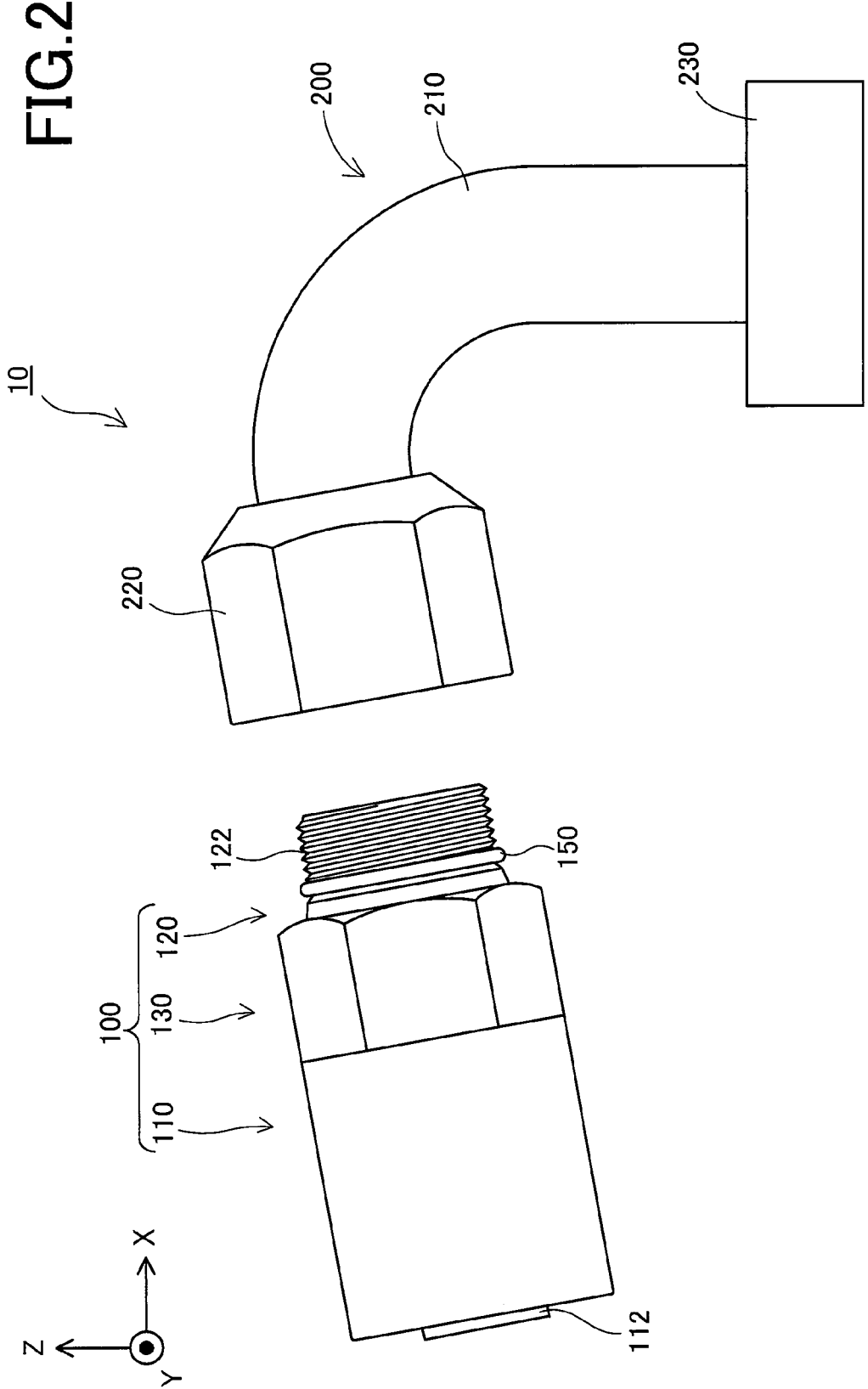
FIG. 2 is an explanatory view illustrating an XZ plane configuration of a mouthpiece 100 and a pipe member 200 according to the first embodiment.

A-1. Configuration of Hydraulic Adapter Unit 10:

FIG. 1 is an explanatory view illustrating an XZ cross-sectional configuration of a hydraulic adapter unit 10 according to a first embodiment, and FIG. 2 is an explanatory view illustrating an XZ plane configuration of a mouthpiece 100 and a pipe member 200 according to the first embodiment. FIG. 1 shows the hydraulic adapter unit 10 in a state in which the mouthpiece 100 and the pipe member 200 are connected, and FIG. 2 shows the hydraulic adapter unit 10 in a state in which the mouthpiece 100 and the pipe member 200 are separated. In each view, mutually orthogonal XYZ axes for specifying directions are shown. Although the positive Z-axis direction is referred to herein as an upward direction and the negative Z-axis direction is referred to herein as a downward direction for convenience, the hydraulic adapter unit 10 may actually be installed in a direction different from such a direction. The same applies to FIG. 3 and subsequent figures.

As shown in FIG. 1, the hydraulic adapter unit 10 couples the hose 60 with the hydraulic device 50 to allow hydraulic fluid to be supplied from the hose 60 to the hydraulic device 50. The hydraulic device 50 is, for example, a device for driving a hydraulic pump (not shown) by an external drive source (electric motor or engine) to operate an actuator (for example, hydraulic motor or hydraulic cylinder) by a hydraulic fluid (hydraulic oil) having a pressure generated by the hydraulic pump. Examples of the hydraulic device 50 include: construction machines such as hydraulic excavators; industrial vehicles such as forklifts; agricultural machines such as tractors; specially equipped vehicles such as dump trucks; general industrial machines such as iron making machines, machining tools, and injection molding machines; and seismic isolation devices for buildings. In this embodiment, the hose 60 is a hose for high pressure, and is formed of, for example, rubber or resin. One end of the hose 60 is connected to an oil supply (not shown). Hereinafter, with regard to each member, the hose 60 side is referred to as the "proximal end", and the hydraulic device 50 side is referred to as the "distal end".

As shown in FIGS. 1 and 2, the hydraulic adapter unit 10 includes a mouthpiece 100 and a pipe member 200, and as described later, the mouthpiece 100 and the pipe member 200 can be separated from each other (see FIG. 2). The mouthpiece 100 corresponds to the hose connecting member in the claims.

Configuration of Mouthpiece 100

The mouthpiece 100 is a substantially cylindrical member as a whole, and has a mouthpiece through-hole 102 formed therein and penetrating from the proximal end to the distal end. The mouthpiece through-hole 102 is a hole extending substantially straightly along the axial direction of the mouthpiece 100. The mouthpiece 100 includes a hose fixing portion 110, a mouthpiece side combining portion 120, and an intermediate portion 130. The hose fixing portion 110, the mouthpiece side combining portion 120, and the intermediate portion 130 are integrally formed of, for example, metal, steel material (carbon steel, alloy steel, stainless steel, or the like), or resin, among other materials. The mouthpiece side combining portion 120 corresponds to the first combining portion in the claims.

The hose fixing portion 110 is disposed on the proximal end side (hose 60 side) of the mouthpiece 100. The hose fixing portion 110 has an inner cylindrical portion 112 having a substantially cylindrical shape and an outer cylindrical portion 114 having a substantially cylindrical shape and disposed so as to surround the inner cylindrical portion 112. The inner peripheral surface of the inner cylindrical portion 112 constitutes the mouthpiece through-hole 102. The outer diameter of the inner cylindrical portion 112 is smaller than the outer diameter of the intermediate portion 130. The inner diameter of the outer cylindrical portion 114 is larger than the outer diameter of the inner cylindrical portion 112. Therefore, a groove 116 is formed between the inner cylindrical portion 112 and the outer cylindrical portion 114. The groove 116 extends from the proximal end of the mouthpiece 100 toward the distal end (pipe member 200 side). The groove 116 has a substantially annular shape in the axial view of the mouthpiece 100. The distal end portion of the hose 60 is inserted into the groove 116, and is caulked with the hose fixing portion 110 (outer cylindrical portion 114) by a caulking tool (not shown). Therefore, the distal end portion of the hose 60 is sandwiched and fixed between the inner cylindrical portion 112 and the outer cylindrical portion 114. The inner cylindrical portion 112 protrudes from the outer cylindrical portion 114 toward the hose 60. The outer peripheral surface of the outer cylindrical portion 114 forms a part of the outer peripheral surface of the mouthpiece 100.

The mouthpiece side combining portion 120 is disposed on the distal end side (hydraulic device 50 side) of the mouthpiece 100. The mouthpiece side combining portion 120 has a male screw portion 122 formed on the outer peripheral surface of the mouthpiece 100. The intermediate portion 130 is disposed between the hose fixing portion 110 and the mouthpiece side combining portion 120 to link them. The outer shape of the intermediate portion 130 in the axial direction is polygonal (e.g., hexagonal). The outer diameter of the intermediate portion 130 is substantially the same as the outer diameter of the hose fixing portion 110.

As shown in FIG. 2, a seal member (O-ring 150) is fitted to the outer peripheral surface of a portion of the mouthpiece 100 between the male screw portion 122 and the intermediate portion 130.

Configuration of Pipe Member 200

The pipe member 200 includes a pipe body 210, a pipe side combining portion 220, and a flange portion 230. The pipe body 210, the pipe side combining portion 220, and the flange portion 230 are integrally formed of, for example, metal, steel material (carbon steel, alloy steel, stainless steel, or the like), or resin, among other materials. The pipe side combining portion 220 corresponds to the second combining portion in the claims.

The pipe body 210 is substantially tubular and has a pipe through-hole 212 formed therein and penetrating from the proximal end to the distal end of the pipe body 210. The length of the pipe body 210 in the axial direction is longer than the length of the mouthpiece 100 in the axial direction. The pipe body 210 has a bent portion 214. In this embodiment, the bent portion 214 is bent so that an angle formed by a pair of straight portions 216, 218 located on both sides of the bent portion 214 is approximately 90 degrees.

The pipe side combining portion 220 is disposed on the proximal end side (the mouthpiece 100 side) of the pipe body 210. The pipe side combining portion 220 has a substantially annular shape (nut-like shape) with a nut through-hole 222 formed therein. The proximal end portion of the pipe body 210 is inserted and fixed to the inner peripheral surface (nut through-hole 222) on the distal end side of the pipe side combining portion 220. The pipe body 210 may be fixed to the pipe side combining portion 220 by press-fitting, for example, but it is particularly preferable that the pipe body is firmly fixed by frictional compression bonding. On the inner peripheral surface (the nut through-hole 222) on the proximal end side of the pipe side combining portion 220, a female screw portion 224 is formed. The female screw portion 224 can be screwed to the male screw portion 122 formed on the mouthpiece 100. Therefore, the mouthpiece side combining portion 120 of the mouthpiece 100 and the pipe side combining portion 220 of the pipe member 200 are separably combined to each other. When the mouthpiece side combining portion 120 and the pipe side combining portion 220 are combined, the O-ring 150 is sandwiched between them. Thus, the gap between the mouthpiece 100 and the pipe member 200 is sealed to prevent the leakage of the hydraulic oil.

In order to secure the strength of the pipe side combining portion 220, the thickness (the distance between the inner peripheral surface and the outer peripheral surface) of the pipe side combining portion 220 is greater than the thickness (the distance between the inner peripheral surface and the outer peripheral surface) of the pipe body 210. Further, the outer diameter of the pipe side combining portion 220 is larger than the outer diameter of the pipe body 210. The pipe side combining portion 220 is disposed at a position separated from the bent portion 214 of the pipe body 210, in other words, at the straight portion 216 of the pipe body 210 on the mouthpiece 100 side. The outer shape of the pipe side combining portion 220 in the axial direction is polygonal (e.g., hexagonal). Thus, since the outer shape of the intermediate portion 130 in the axial direction and the outer shape of the pipe side combining portion 220 in the axial direction are both polygonal, they can be screwed firmly using a fastening jig (not shown) as compared with a configuration in which the outer shapes are circular.

The flange portion 230 is disposed on the distal end side (hydraulic device 50 side) of the pipe body 210. The flange portion 230 is formed to project outward in the radial direction of the pipe body 210. The flange portion 230 has a substantially circular flat plate shape in the axial view of the pipe body 210. The flange portion 230 has a facing surface 232 disposed to face a wall surface 52 of the housing of the hydraulic device 50. The facing surface 232 of the flange portion 230 is disposed on the wall surface 52 of the hydraulic device 50 so that the pipe through-hole 212 of the pipe body 210 communicates with an introduction hole 51 formed on the wall surface 52 of the hydraulic device 50. On the facing surface 232 of the flange portion 230, there are formed a plurality of recessed portions 234 into which a plurality of projecting portions 56 formed on the wall surface 52 of the hydraulic device 50 are respectively inserted, so that the flange portion 230 is positioned with respect to the hydraulic device 50 by engagement of the plurality of projecting portions 56 and the plurality of recessed portions 234.

The flange portion 230 of the pipe member 200 is fixed to the hydraulic device 50 by a pressing member 20. Specifically, the pressing member 20 is a substantially flat member that covers a opposite surface 236 on the side opposite to the facing surface 232 and a side surface 238 of the flange portion 230. In the pressing member 20, a plurality of bolt holes 28 are formed, and bolts 30 inserted into the plurality of bolt holes 28 are screwed into screw holes 54 formed in the wall surface of the hydraulic device 50, whereby the flange portion 230 is fixed to the hydraulic device 50. The pressing member 20 may be formed of a single component (so-called square flange) or a plurality of components (so-called split flange).

Figure 3:
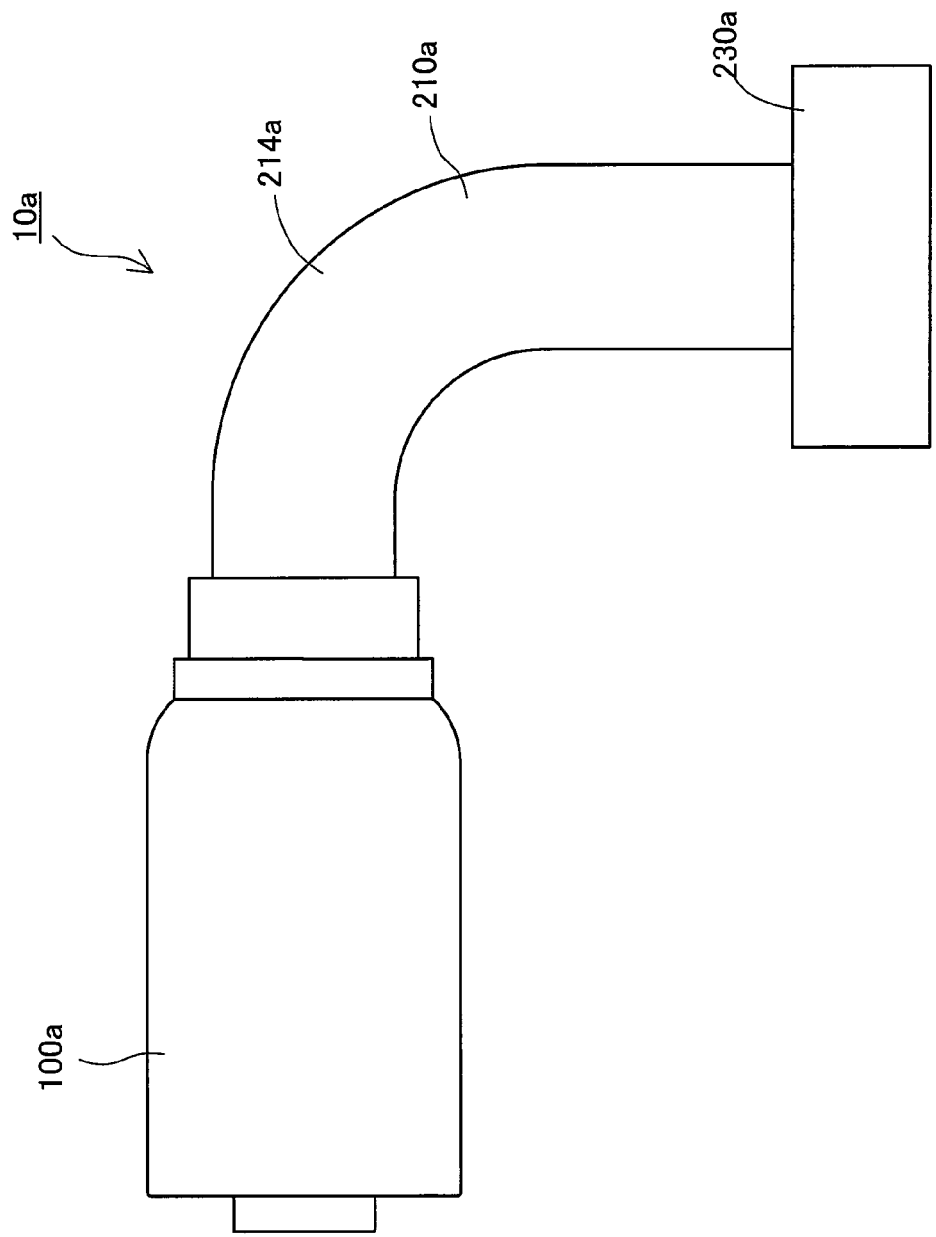
FIG. 3 is an explanatory view illustrating an XZ plane configuration of a hydraulic adapter unit 10a according to a comparative example.

A-2. Effect of the Present Embodiment:

FIG. 3 is an explanatory view illustrating an XZ plane configuration of the hydraulic adapter unit 10a according to a comparative example. As shown in FIG. 3, the hydraulic adapter unit 10a according to the comparative example includes: a tubular pipe body 210a; a mouthpiece portion 100a formed on one end side of the pipe body 210a and to which the hose 60 is fixed; and a flange portion 230a formed on the other end side of the pipe body 210a so as to project outward in the radial direction of the pipe body 210a and fixed to the hydraulic device 50. In the hydraulic adapter unit 10a, the pipe body 210a, the mouthpiece portion 100a, and the flange portion 230a are integrally formed and inseparable. Therefore, in the hydraulic adapter unit 10a in the comparative example, when the hose 60 fixed to the mouthpiece portion 100a deteriorates and needs to be replaced, the entire hydraulic adapter unit 10a has to be replaced. When fixing the hose 60 to the mouthpiece portion 100a of the hydraulic adapter unit 10a, the pipe body 210a and the flange portion 230a interfere the work, so that it is difficult or impossible to perform caulking using a caulking tool. In the hydraulic adapter unit 10a according to the comparative example, the pipe body 210a has a bent portion 214a. Therefore, the presence of the bent portion 214a further makes it difficult or impossible to carry out the caulking.

On the contrary, in the hydraulic adapter unit 10 according to the present embodiment, the mouthpiece 100 to which the hose 60 is fixed and the pipe member 200 having the flange portion 230 fixed to the hydraulic device 50 are separably combined to each other (see FIGS. 1 and 2). Thus, by separating the mouthpiece 100 and the pipe member 200, the fixing work of the pipe member 200 to the hydraulic device 50 or the fixing work of the hose 60 to the mouthpiece 100 can be carried out independently. In other words, according to the present embodiment, it is possible to improve the workability of the coupling between the hose 60 and the hydraulic device 50.

Further, in the present embodiment, since the pipe side combining portion 220 of the pipe member 200 has the female screw portion 224, the hydraulic oil supplied from the hose 60 to the hydraulic device 50 can be prevented from leaking out from the portion between the mouthpiece 100 and the pipe member 200 as compared with a configuration in which the pipe side combining portion 220 has a male screw portion. Further, in the pipe member 200 in which the mouthpiece 100 is removed from the hose and left fixed to the hydraulic device 50 when replacing the hose, the screw portion is not exposed to the outside, so that it is possible to prevent, for example, the damage of the screw portion which would otherwise be caused by receiving an impact from the outside.

In this embodiment, the pipe body 210 of the pipe member 200 has the bent portion 214. In such a configuration in which the pipe body 210 of the pipe member 200 has the bent portion 214 as described above, for example, the bent portion 214 interfere the fixing work of the hose 60 to the mouthpiece 100, thereby making the fixing work to be impossible or difficult. With regard to this, in the present embodiment, by separating the mouthpiece 100 and the pipe member 200, the hose 60 can be fixed to the mouthpiece 100 without being interfered by the bent portion 214 of the pipe member 200.

B. Second Embodiment

B-1. Configuration of Pipe Member 200X

Figure 4:
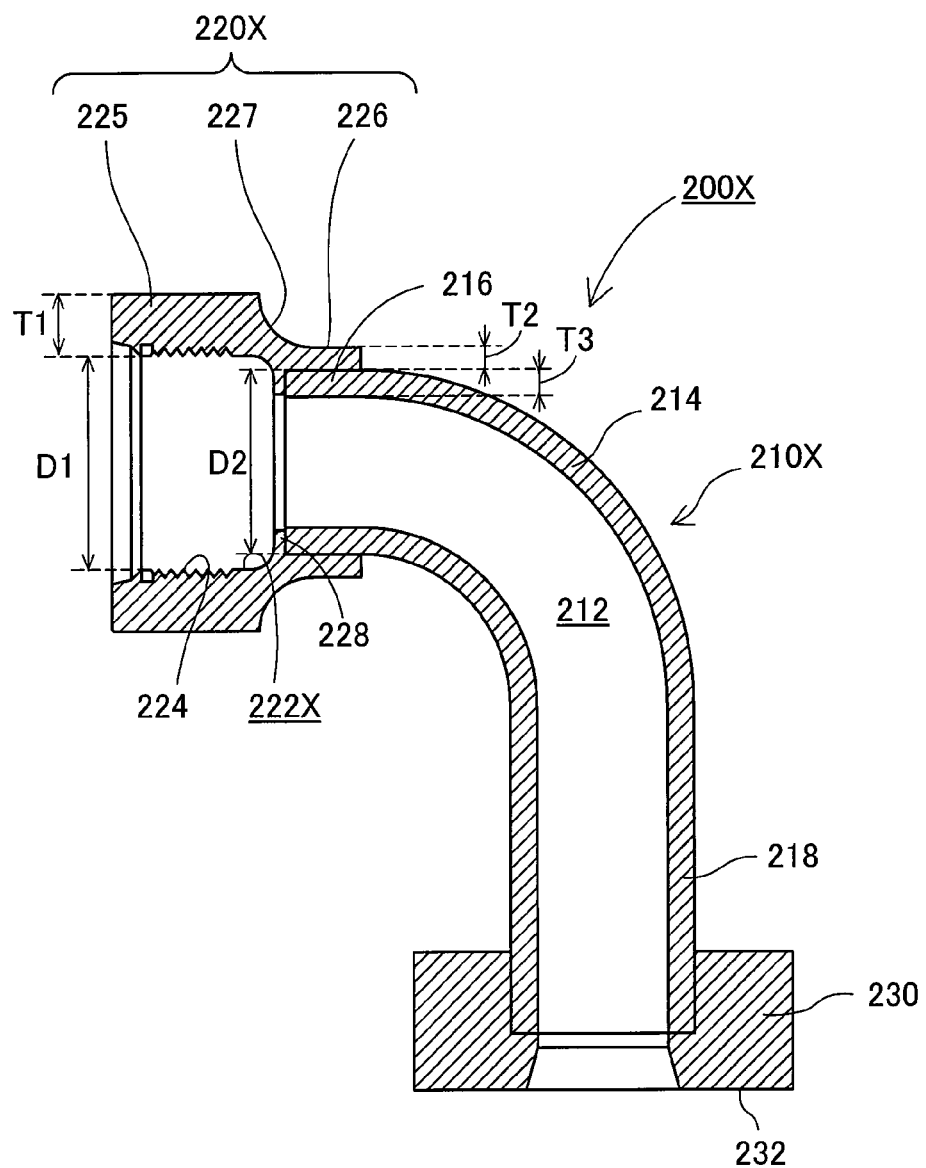
FIG. 4 is an explanatory view illustrating an XZ cross-sectional configuration of a pipe member 200X according to a second embodiment.

FIG. 4 is an explanatory view illustrating an XZ cross-sectional configuration of a pipe member 200X according to a second embodiment, and FIG. 5 is an explanatory view illustrating an XZ plane configuration of the pipe member 200X according to the second embodiment. The pipe member 200X of the second embodiment is a member for coupling the mouthpiece 100 with the hydraulic device 50 as with the pipe member 200 of the first embodiment. The same components of the pipe member 200X as those of the pipe member 200 of the first embodiment are denoted by the same reference numerals, and a description thereof will be omitted.

The pipe member 200X includes a pipe body 210X, a pipe side combining portion 220X, and a flange portion 230. The pipe body 210X, the pipe side combining portion 220X, and the flange portion 230 are each formed of, for example, a metal or a steel material (carbon steel, alloy steel, stainless steel, or the like). The pipe side combining portion 220X corresponds to the second combining portion in the claims.

The pipe side combining portion 220X is disposed at the proximal end side of the pipe body 210X (the mouthpiece 100 side in FIG. 1). The pipe side combining portion 220X has a substantially annular shape (nut-like shape) with a nut through-hole 222X formed therein. The pipe side combining portion 220X has a thick-walled portion 225, a thin-walled portion 226 and a tapered portion 227. The thick-walled portion 225 corresponds to one end portion in the claims, and the thin-walled portion 226 corresponds to the other end portion in the claims.

The thick-walled portion 225 is positioned at the proximal end side of the pipe side combining portion 220X (the mouthpiece 100 side in FIG. 1). The outer peripheral surface of the thick-walled portion 225 is substantially parallel to the axial direction (X-axis direction in FIG. 4) of the pipe side combining portion 220X. In this specification, "A and B are substantially parallel" means that the angle difference between A and B is ±5 degrees or less (the same applies hereinafter). On the inner peripheral surface of the thick-walled portion 225, the female screw portion 224 is formed. In this embodiment, the outer shape of the thick-walled portion 225 in the axial direction is substantially circular. However, the outer shape of the thick-walled portion 225 in the axial direction may be, for example, a polygon (e.g., hexagon).

The thin-walled portion 226 is located on the distal end side (the pipe body 210X side) of the pipe side combining portion 220X. The outer diameter (diameter of the circumscribed circle) of the thin-walled portion 226 is smaller than the outer diameter (diameter of the circumscribed circle) of the thick-walled portion 225. The outer peripheral surface of the thin-walled portion 226 is substantially parallel to the axial direction (X-axis direction in FIG. 4) of the pipe side combining portion 220X. In this embodiment, the outer shape of the thin-walled portion 226 in the axial direction is substantially circular. However, the outer shape of the thin-walled portion 226 in the axial direction may be, for example, a polygon (e.g., hexagon). The thickness T1 of the thick-walled portion 225 in the radial direction is larger than the thickness T2 of the thin-walled portion 226 in the radial direction and larger than the thickness T3 of the pipe body 210X in the radial direction. The thickness T2 of the thin-walled portion 226 is closer to the thickness T3 of the pipe body 210X than the thickness T1 of the thick-walled portion 225. In this embodiment, the thickness T2 of the thin-walled portion 226 and the thickness T3 of the pipe body 210X are substantially the same. The thickness T1 of the thick-walled portion 225 in the radial direction is 2 times or more of the thickness T2 of the thin-walled portion 226 or the thickness T3 of the pipe body 210X.

The tapered portion 227 is positioned between the thick-walled portion 225 and the thin-walled portion 226 in the axial direction (X-axis direction in FIG. 4), and links the thick-walled portion 225 and the thin-walled portion 226. The outer diameter of the tapered portion 227 continuously decreases from the thick-walled portion 225 to the thin-walled portion 226. The outer peripheral surface of the tapered portion 227 is formed flush with the outer peripheral surface of the thin-walled portion 226. That is, in the outer peripheral surface of the pipe side combining portion 220X, the outer peripheral surface formed by the tapered portion 227 and the thin-walled portion 226 are smooth curved surfaces without steps or corners. In the present embodiment, the outer peripheral surface of the tapered portion 227 is a concave curved and inclined surface, but may be a straightly inclined surface or a stepwise inclined surface.

In the present embodiment, with regard to the nut through-hole 222X of the pipe side combining portion 220X, the diameter D1 of the proximal end side hole into which the mouthpiece side combining portion 120 of the mouthpiece 100 is inserted is larger than the diameter D2 of the distal end side hole into which the pipe body 210X is inserted. On the inner peripheral side of the pipe side combining portion 220X, there is formed a rib 228 positioned between the proximal end side hole and the distal end side hole and projecting toward the center of the pipe side combining portion 220X. The proximal end face of the pipe body 210X is positioned by abutting on this rib 228. A step portion (near the rib 228) between the proximal end side hole and the distal end side hole is positioned at the inner peripheral side of the tapered portion 227.

B-2. Method for Manufacturing Pipe Member 200X

Figure 6:
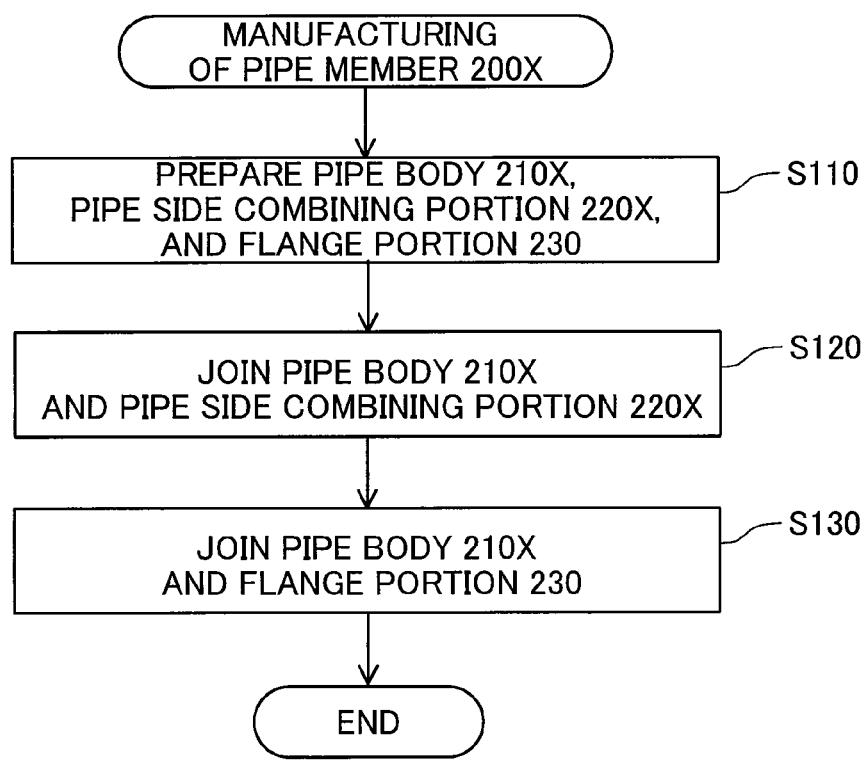
FIG. 6 is a flow chart illustrating a method for manufacturing the pipe member 200X.

FIG. 6 is a flowchart illustrating a method for manufacturing the pipe member 200X, and FIG. 7 is an explanatory view illustrating a part of a manufacturing process of the pipe member 200X. For convenience, the heating unit 330 described later is shown by a virtual line.

First, the pipe body 210X, the pipe side combining portion 220X, and the flange portion 230 described above are prepared (S110). This step corresponds to the preparation step in the claims. The pipe body 210X, the pipe side combining portion 220X, and the flange portion 230 can be formed by casting, for example.

Next, the pipe body 210X and the pipe side combining portion 220X are joined (S120). This step corresponds to the joining step in the claims. That is, the pipe body 210X is inserted into the inner peripheral side of the thin-walled portion 226 of the pipe side combining portion 220X, a brazing material 310 is disposed in the vicinity of the inner peripheral side of the thin-walled portion 226, and a high-frequency induction heating treatment is performed by flowing an alternating current to a heating unit 330 (a first coil 332, a second coil 334, and a third coil 336) disposed so as to surround the thin-walled portion 226.

Specifically, as shown in FIG. 7, a high-frequency brazing machine (a high-frequency induction heating device) is used. For example, the pipe side combining portion 220X is placed on a table 300 of the high-frequency brazing machine. In this placement, the pipe side combining portion 220X is arranged so that the thick-walled portion 225 is positioned at the lower side and the thin-walled portion 226 is positioned at the upper side. Next, the brazing material 310 (for example, annular silver braze) is disposed in the peripheral portion of the opening of the thin-walled portion 226. Thereafter, the annular heating unit 330 provided in the high-frequency brazing machine is disposed so as to surround the whole periphery of at least the tapered portion 227 in the pipe side combining portion 220X. In this case, the heating unit 330 is provided therein with three coils (the first coil 332, the second coil 334, and the third coil 336)

arranged vertically. The first coil 332 is disposed so as to surround the periphery of the pipe body 210X. The second coil 334 is disposed so as to surround the periphery of the thin-walled portion 226 of the pipe side combining portion 220X. The third coil 336 is disposed so as to surround the periphery of the thick-walled portion 225 of the pipe side combining portion 220X.

The first coil 332, the second coil 334, and the third coil 336 have substantially the same cross-sectional areas (cross sections) perpendicular to the axial direction. Further, the inner diameter of the first coil 332 and the inner diameter of the second coil 334 are substantially the same, and the inner diameter of the third coil 336 is larger than the inner diameter of the first coil 332 and the inner diameter of the second coil 334. Therefore, in the radial direction of 220X, the distance between the first coil 332 and the pipe body 210X, the distance between the second coil 334 and the thin-walled portion 226, and the distance between the third coil 336 and the thick-walled portion 225 are substantially the same. In the vertical direction (Z-axis direction), the distance between the second coil 334 and the third coil 336 is longer than the distance between the first coil 332 and the second coil 334. In the heating unit 330, the first coil 332, the second coil 334, and the third coil 336 are covered with an insulating material.

Next, the straight portion 216 of the pipe body 210 is inserted via the heating unit 330 and the brazing material 310 to the inner peripheral side of the thin-walled portion 226 of the pipe side combining portion 220X. Thus, an assembly 200P before joining the pipe body 210X and the pipe side combining portion 220X is formed. Then, the high-frequency brazing machine is activated to flow an alternating current to the heating unit 330 (the coils 332, 334, 336), whereby the pipe body 210X and the thin-walled portion 226 of the pipe side combining portion 220X generate heat by self-heating.

As described above, since the thick-walled portion 225 is thicker than the thin-walled portion 226, the heat generated in the thin-walled portion 226 easily escaped to the thick-walled portion 225, and the thin-walled portion 226 might not be heated to the same temperature as the pipe body 210X. However, in this embodiment, since the thick-walled portion 225 of the pipe side combining portion 220X also generates heat by self-heating caused by the third coil 336, the thin-walled portion 226 can be sufficiently heated. By heating the pipe body 210X and the thin-walled portion 226, the brazing material 310 melts and enters between the thin-walled portion 226 and the pipe body 210X. Thus, the pipe body 210X and the pipe side combining portion 220X are brazed to be firmly joined. Before heating by the heating unit 330, brazing flux may be applied to at least one of the pipe body 210 and the thin-walled portion 226 of the pipe side combining portion 220X. Thus, the oxide film between the pipe body 210 and the pipe side combining portion 220X is removed, and both can be joined more firmly.

The thin-walled portion 226 in the pipe side combining portion 220X has an outer diameter smaller than the outer diameter of the thick-walled portion 225, and the outer peripheral surface is substantially parallel to the axial direction of the pipe side combining portion 220X. Therefore, for example, as compared with a configuration in which the outer diameter of the thin-walled portion 226 is relatively large or a configuration in which the outer peripheral surface of the thin-walled portion 226 is inclined with respect to the axial direction, the thin-walled portion 226 can be heated efficiently and uniformly, so that the pipe body 210 and the pipe side combining portion 220X can be joined more firmly.

Next, the pipe body 210X and the flange portion 230 are joined (S130). The pipe body 210X and the flange portion 230 can be joined by a known joining method or the joining method in step 120, among other methods. Thus, the manufacture of the pipe member 200X is completed. It should be noted that, before the processing in step 120, the pipe body 210X and the flange portion 230 may be joined together in advance.

B-3. Effect of the Present Embodiment

In this embodiment, with regard to the pipe side combining portion 220X of the pipe member 200X, the thickness T1 of the thick-walled portion 225 is thicker than the thickness T2 of the thin-walled portion 226 and the thickness T3 of the pipe body 210X (see FIG. 4). Thus, for example, as compared with the constitution in which the thickness T1 of the thick-walled portion 225 is as thin as the thickness T2 of the thin-walled portion 226, it is possible to improve the strength of the thick-walled portion 225 where the female screw portion 224 is formed. On the other hand, the thickness T2 of the thin-walled portion 226 is closer to the thickness T3 of the pipe body 210X than the thickness T1 of the thick-walled portion 225. Therefore, as compared with a configuration in which the thickness T2 of the thin-walled portion 226 is as thick as the thickness T1 of the thick-walled portion 225, it is possible to reduce the size and weight of the pipe side combining portion 220X (the pipe member 200X). Further, for example, as compared with a configuration in which the thickness T2 of the thin-walled portion 226 is closer to the thickness T1 of the thick-walled portion 225 than the thickness T3 of the pipe body 210X, it is possible to suppress stress concentration which would otherwise be caused by the thickness difference between the thin-walled portion 226 and the pipe body 210X. For example, it is possible to prevent damage which would otherwise be caused by stress concentration at a predetermined portion of the thin-walled portion 226 due to the hydraulic pressure (e.g., 350 kPa) or pressure changes of the hydraulic fluid flowing through the pipe member 200X.

In the present embodiment, in the pipe side combining portion 220X of the pipe member 200X, the thin-walled portion 226 to which the pipe body 210X is joined has an outer diameter smaller than that of the thick-walled portion 225. In addition, the outer peripheral surface of the thin-walled portion 226 is substantially parallel to the axial direction of the pipe side combining portion 220X. Therefore, as compared with, for example, a configuration in which the outer diameter of the thin-walled portion 226 is relatively large or a configuration in which the outer peripheral surface of the thin-walled portion 226 is inclined with respect to the axial direction, it is possible to relax stress concentration at the portion at which the pipe body 210X is joined with the pipe side combining portion 220X while limiting the size of the pipe side combining portion 220X.

In the present embodiment, the pipe side combining portion 220X of the pipe member 200X has a tapered portion 227 linking the thick-walled portion 225 and the thin-walled portion 226, and the tapered portion 227 has an outer diameter continuously decreasing from the thick-walled portion 225 toward the thin-walled portion 226. As a result, as compared with, for example, a configuration in which a step is formed between the thick-walled portion 225 and the thin-walled portion 226, it is possible to relax stress concentration between the thick-walled portion 225 and the thin-walled portion 226 and avoid a thin-walled portion with low strength to be formed at the pipe side combining portion 220X due to the existence of the step.

C. Modifications

The techniques disclosed herein are not limited to the embodiments described above, but may be modified in various forms without departing from the spirit and scope thereof, and the following modifications, for example, are also possible.

The configuration of the hydraulic adapter unit 10, the mouthpiece 100, or the pipe members 200, 200X in the above embodiment is merely an example and can be variously modified. For example, the mouthpiece 100 may be a substantially square cylindrical member. The mouthpiece 100 may have a shape having a bent portion. The outer shape of the intermediate portion 130 and the pipe side combining portion 220 in the axial direction may be, for example, substantially circular.

In the above embodiment, the bent portion 214 may be a rectangularly bent portion (L-shape) or a curved portion (C-shape). Specifically, the angle formed by the pair of straight portions 216, 218 in the bent portion 214 of the pipe body 210, 210X may be, for example, about 30 degrees, about 45 degrees, about 60 degrees, about 90 degrees, or about 120 degrees. Further, the pipe body 210, 210X may be a substantially straight tubular member.

In the above embodiment, the mouthpiece 100 may have a female screw portion and the pipe member 200 may have a male screw portion. Alternatively, the mouthpiece 100 and the pipe member 200 may be formed with respective male screw portions and the mouthpiece 100 and the pipe member 200 may be separably combined to each other by a nut member (not shown) formed with a pair of female screw portions screwed to each of the male screw portion of the mouthpiece 100 and the male screw portion of the pipe member 200. Alternatively, the mouthpiece 100 and the pipe member 200 may be formed with respective female screw portions and the mouthpiece 100 and the pipe member 200 may be separably combined to each other by a nut member (not shown) formed with a pair of male screw portions screwed to each of the female screw portion of the mouthpiece 100 and the female screw portion of the pipe member 200. In addition, the mouthpiece 100 and the pipe member 200 may be separably combined by a combining mechanism other than the screw mechanism (for example, a fitting mechanism or an engagement mechanism).

In the above embodiment, the flange portion 230 of the pipe member 200 may be formed with a bolt hole and fixed to the hydraulic device 50 by a bolt inserted in the bolt hole without using the pressing member 20.

Further, in the above embodiment, at least two of the pipe body 210, 210X, the pipe side combining portion 220, 220X, and the flange portion 230 may be integrally formed instead of the configuration formed by joining separate parts. The pipe side combining portion 220, 220X may have an uniform outer diameter over the entire length or may have a uniform thickness over the entire length.

The material for forming the hydraulic adapter unit 10, the mouthpiece 100, or the pipe member 200 in the above embodiment is merely an example and can be variously modified.

The method for manufacturing the pipe side combining portion 220X in the above embodiment is merely an example and can be variously modified. For example, in step 120, the pipe body 210X and the pipe side combining portion 220X may be joined by a brazing material other than silver braze, or may be joined by a method other than brazing, such as friction bonding.

REFERENCE SIGNS LIST

10: hydraulic adapter unit, 10a: hydraulic adapter unit, 20: pressing member, 28: bolt hole, 30: bolt, 50: hydraulic device, 51: introduction hole, 52: wall surface, 54: screw hole, 56: projecting portion, 60: hose, 100: mouthpiece, 100a: mouthpiece portion, 102: mouthpiece through-hole, 110: hose fixing portion, 112: inner cylindrical portion, 114: outer cylindrical portion, 116: groove, 120: mouthpiece side combining portion, 122: male screw portion, 130: intermediate portion, 150: O-ring, 200, 200x: pipe member, 200P: assembly, 210, 210a, 210X: pipe body, 212: pipe through-hole, 214, 214a: bent portion, 216, 218: straight portion, 220, 220X: pipe side combining portion, 222, 222X: nut through-hole, 224: female screw portion, 225: thick-walled portion, 226: thin-walled portion, 227: tapered portion, 230, 230a flange portion, 232: facing surface, 234: recessed portion, 236: opposite surface, 238: side surface, 300: table, 310: brazing material, 330: heating unit, 332: first coil, 334: second coil, 336: third coil

The invention claimed is:

1. A hydraulic adapter unit for coupling a hose with a hydraulic device, comprising:
   a substantially cylindrical hose connecting member including: a hose fixing portion positioned at one end side of the hose connecting member and to which the hose is fixed; a first combining portion positioned at the other end side of the hose connecting member; and an intermediate portion linking the hose fixing portion and the first combining portion; and
   a pipe member including: a substantially tubular pipe body; a second combining portion disposed at the one end side of the pipe body and separably combined to the first combining portion of the hose connecting member; and a flange portion disposed at the other end side of the pipe body and formed so as to project outward in the radial direction of the pipe body and fixed to the hydraulic device,
   wherein the first combining portion of the hose connecting member has a male screw portion formed on an outer peripheral surface of the hose connecting member, and
   wherein the second combining portion of the pipe member has a female screw portion formed on an inner peripheral surface of the pipe member and screwed to the male screw portion of the first combining portion.

2. The hydraulic adapter unit according to claim 1, wherein the second combining portion of the pipe member is substantially annular and includes:
   one end portion positioned at the one end side of the second combining portion and having the female screw portion formed on the inner peripheral side; and
   the other end portion which is positioned at the other end side of the second combining portion and to which the pipe body is inserted and joined on the inner peripheral side,
   wherein the thickness of the one end portion is greater than the thickness of the other end portion and greater than the thickness of the pipe body, and the thickness of the other end portion is closer to the thickness of the pipe body than the thickness of the one end portion.

3. The hydraulic adapter unit according to claim 2,
wherein the outer diameter of the other end portion is smaller than the outer diameter of the one end portion, and the outer peripheral surface of the other end portion is substantially parallel to the axial direction of the second combining portion.

4. The hydraulic adapter unit according to claim 3,
wherein the second combining portion of the pipe member has a tapered portion linking the one end portion and the other end portion and having an outer diameter continuously decreasing from the one end portion toward the other end portion.

5. The hydraulic adapter unit according to claim 1,
wherein the pipe body in the pipe member has a bent portion having a bent shape.

6. The hydraulic adapter unit according to claim 1, further comprising
an annular sealing member fitted to the outer circumferential surface of the first combining portion on the proximal side of the male threaded portion that is screwed into the female threaded portion,
wherein the sealing member is sandwiched between the hose connecting member and the pipe member in a state where the hose connecting member and the pipe member are combined.

7. A hydraulic pipe member for coupling a hydraulic device with a hose connecting member having one end side to which a hose is fixed and the other end side on which a first combining portion is formed, comprising:
    a tubular pipe body;
    a second combining portion disposed on the one end side of the pipe body and separably combined to the first combining portion of the hose connecting member; and
    a flange portion disposed on the other end side of the pipe body and formed to project outward in the radial direction of the pipe body and fixed to the hydraulic device,
wherein the first combining portion of the hose connecting member has a male screw portion formed on an outer peripheral surface of the hose connecting member, and
wherein the second combining portion of the pipe member has a female screw portion formed on an inner peripheral surface of the pipe member and screwed to the male screw portion of the first combining portion,
wherein the second combining portion of the pipe member is substantially annular and includes:
one end portion positioned at the one end side of the second combining portion and having the female screw portion formed on the inner peripheral side; and
the other end portion which is positioned at the other end side of the second combining portion and to which the pipe body is inserted and joined on the inner peripheral side,
wherein the thickness of the one end portion is greater than the thickness of the other end portion and greater than the thickness of the pipe body, and the thickness of the other end portion is closer to the thickness of the pipe body than the thickness of the one end portion, and
wherein the one end portion and the other end portion are each arranged at the respective axial terminal ends of the second combining portion.

8. The hydraulic pipe member according to claim 7,
wherein the outer diameter of the other end portion is smaller than the outer diameter of the one end portion, and the outer peripheral surface of the other end portion is substantially parallel to the axial direction of the second combining portion.

9. The hydraulic pipe member according to claim 7,
wherein the second combining portion has a tapered portion linking the one end portion and the other end portion and having an outer diameter continuously decreasing from the one end portion toward the other end portion.

* * * * *